Figure 1:
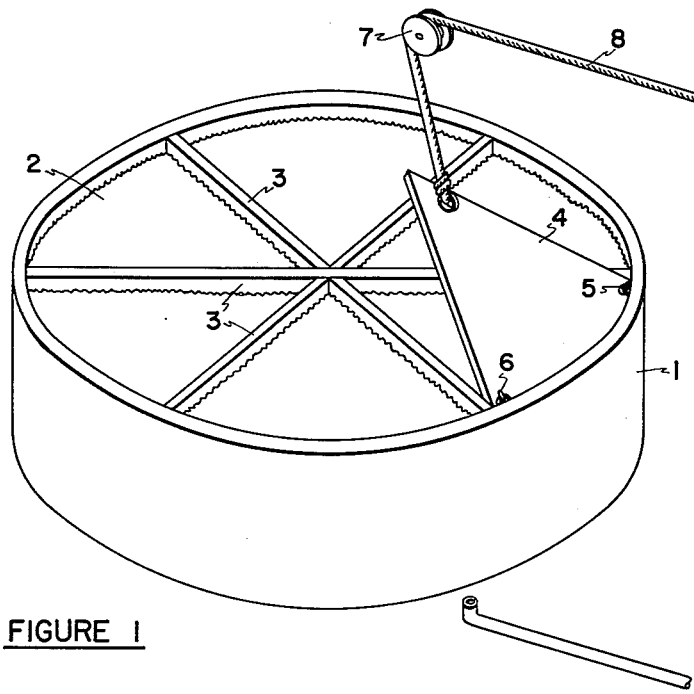

June 4, 1963 W. W. BRAY, JR., ETAL 3,092,674
PROCESS FOR THE DEHYDROGENATION OF OLEFINS
Filed June 11, 1959

William W. Bray Jr.
Felix J. Ponzek   INVENTORS

BY Seymour Stahl

PATENT ATTORNEY

United States Patent Office 3,092,674
Patented June 4, 1963

3,092,674
PROCESS FOR THE DEHYDROGENATION
OF OLEFINS
William W. Bray, Jr., Scotch Plains, and Felix J. Ponzek, New Brunswick, N.J., assignors to Esso Research and Engineering Company, a corporation of Delaware
Filed June 11, 1959, Ser. No. 819,647
5 Claims. (Cl. 260—680)

This invention relates to a new and improved process and apparatus for the dehydrogenation of $C_4$–$C_6$ olefins to diolefins. More specifically, this invention relates to a fixed bed calcium nickel phosphate on alumina catalyst dehydrogenation process wherein the reactor catalyst bed is divided by a number of plates disposed in parallel relation to the flow of vapors thru the reactor. These plates provide a barrier against the horizontal spread of catalyst deactivation from one segment of the bed to other segments of the bed. Thus, with the particular catalysts utilized in the present invention deactivation or carbon laydown proceeds from a particular point in the catalyst bed by a growth or radiation outwardly through the bed. Thus, carbon "mounds" are formed in the catalyst bed which continually grow larger. Further, this invention relates in a preferred embodiment to blocking off a deactivated section of the bed during the dehydrogenation cycle to thus halt laydown of carbon so that the particular section of the catalyst bed can be completely restored by a sufficient number of regeneration cycles. This must be done before complete deactivation and pulverization of the catalyst in the "mound" prevents any regeneration of the catalyst. In another embodiment, this invention relates to the utilization of a sufficient number of parallel plates to divide the bed into small narrow passageways which will plug up when a carbon mound is formed and thus prevent passage of vapors through the deactivated section of the bed unconverted.

Processes for the dehydrogenation of butene to butadienes, isopentenes and isopentanes to isoprene, and 2,3-dimethyl butene to 2,3-dimethyl butadiene have been known for many years. The importance of the manufacture of these diolefins has in the past few years been increased by the mounting demand for rubber and rubber substitutes and other copolymer products obtained from these diolefins. For example, butadiene is used in synthetic rubber, isoprene is used in synthetic natural rubber and 2,3-dimethyl butadiene has been used as a substitute for isoprene. One of the best known processes for the preparation of these diolefins involves the dehydrogenation of $C_4$–$C_6$ olefins or paraffins in the presence of certain catalysts which will be defined hereinafter and in the presence of large proportions of steam, wherein regeneration of the catalyst is carried out in the presence of steam and air. A typical catalyst of the type amenable to this reaction is calcium nickel phosphate. Other catalysts which may be used for this dehydrogenation to diolefins include alumina chromia catalyst or iron oxide promoted by potassium carbonate. These catalysts are well known in the art and may be employed with or without a potassium promotor. An essential quality of the catalyst employed in the process of this invention is its extremely high activity which, although not inhibited by large proportions of steam and high temperatures which are necessary for obtaining the high selectivity to diolefins in the primary reaction, is susceptible to the "mounding" type of deactivation described above.

Basically, the process per se comprises passing a combined stream of superheated $C_4$–$C_6$ olefins and/or paraffins or a single component such as butenes and large quantities of steam into a reactor containing a solid catalyst bed of the desired type and maintaining the temperatures in said reactor at about 1000° to 1350° F. The product effluent from the reactor must, of course be further processed by such means as quenching or cooling, stripping, absorption, carbonyl removal and other purification steps. Additionally, if a combined stream is dehydrogenated, complicated separation steps to obtain desired pure products will usually be conducted. It is therefore preferred to dehydrogenate only a single component stream. This invention concerns only the interrelation of the reaction and regeneration steps per se so that these subsequent steps involving the purification or separation of the products obtained will not be discussed. In general, the commercial system for this type of reaction will comprise a pair of reactors, one being employed as the primary reactor while the other is subjected to regeneration and both being capable of being switched from a reaction to regeneration operation and vice versa at intervals determined by the catalyst life between regenerations. Typical catalyst life between regenerations for the dehydrogenation of $C_4$–$C_6$ olefins or paraffins to diolefins is from 10 to 60 minutes. Such means for switching the reactors may be automatic or manual as desired. However, it is preferable to have an arrangement whereby continual production of diolefins is uninterrupted by the switching operation.

In a preferred embodiment of this invention a vaporized single component $C_4$–$C_6$ hydrocarbon feed is admixed with superheated steam and contacted with a fixed bed of catalyst at elevated temperatures, the superheated steam boosting the temperatures of the mixture to the desired reaction temperature level. During the regeneration period the vaporized hydrocarbon feed to the catalyst bed is stopped and the catalyst bed purged of all volatile hydrocarbons. After the purging, an oxygen-containing regeneration gas, preferably air or $O_2$ is admitted in excess with superheated steam for timely and adequate combustion of the carbonaceous deposits found on the catalyst, and returning the catalyst to its proper oxidation state. Finally, the regenerated catalyst is purged of combustion products and brought back to reaction conditions.

The high temperatures and large proportions of steam present in the reaction zone have caused difficulties with catalyst deactivation in the operation of the present type process. Thus, the commercial units which are designed to operate, for at least 6 months to pay off the expensive $1.85/lb. catalyst have been obtaining operations of only, for example, 1½ months before mounding (i.e. the growth of a carbon mound in a particular section of a catalyst bed) requires shutdown of the unit. Ordinarily, this catalyst must then be thrown away although attempts have been made to obtain a regeneration or reactivation of the catalyst after mounding has occurred.

It has now been found that much longer onstream periods can be obtained by longitudinally baffling the reactor to prevent spreading of the carbon mound once it starts to other sections of the bed. It is further suggested according to this invention that by blanking off the particular section of the bed where the mound starts to form with a cover, during the dehydrogenation part of the cycle only, that the catalyst in said section can thus be brought back to full use by destroying the mound by burning it out in a number of regeneration cycles. Thus, in this latter embodiment a continuous operation is obtained while at the same time the mound is removed at the expense of only a slight decrease in throughput. The arrangement of plates parallel to the flow of vapors which divide the reactor may be of the type shown in FIGURE 1 or it may be of the lattice or egg crate dividing type shown in FIGURE 2 wherein a much larger number of separate catalyst sections is provided.

Turning now to FIGURE 1 the reaction chamber 1 of a dehydrogenattion reactor containing a catalyst bed 2 is shown. This catalyst bed is supported on a conventional grid not shown. The reaction vapors are passed through the catalyst bed downwardly from above. The plates 3 which are disposed substantially parallel to the flow of vapors thru the reactor extend through the bed as shown. If desired, a cover 4 may be provided to blank off a particular section. This cover may be hinged by hinges 5 and 6 and lifted by pulley 7 and cable 8 as described in the figure or it may otherwise be positioned so that a section may be blanked off as desired. In a particularly preferred embodiment a sample draw off line may be located directly beneath each segment of the bed so that samples of the effluent gases may be passed to a carbon dioxide analyzer during the regeneration cycle. When the analyzer indicates that a carbon mound buildup is occurring the particular deactivated section of the carbon bed may be blanked off during the dehydrogenation cycle. Thus, carbon buildup is stopped and progressively the regeneration gases passing through the mound during the generation cycle burn out the carbon and restore the section to full activity. The carbon dioxide and analyzer indicates by a higher level of carbon dioxide in the regeneration effluent gases that a carbon mound is being developed. Successful regeneration is indicated by a reduction of carbon dioxide level in the effluent gases to normal.

Figure 2:
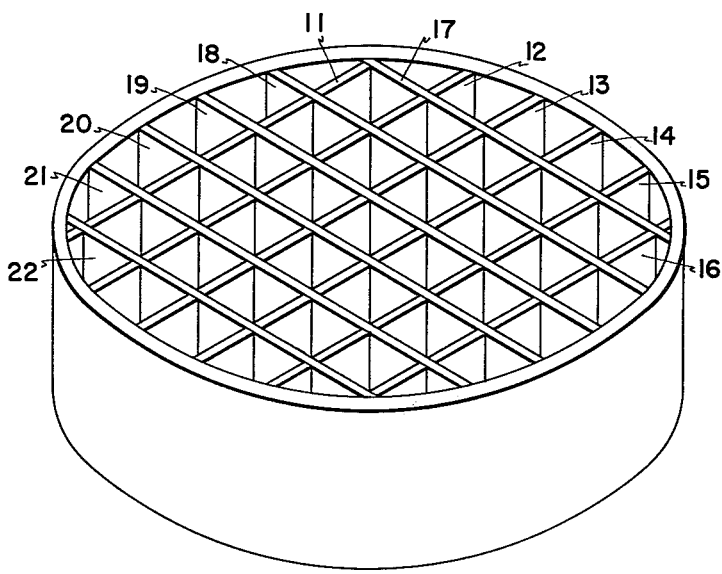

Alternatively, the reactor may be divided as shown in FIGURE 2. Thus a number of parellel plates 11, 12, 13, 14, 15 and 16 and 17, 18, 19, 20, 21 and 22 may be disposed in the reactor as shown preferably the number of parallel plates is such that a particular section of the bed defined by the plates has a horizontal area of 144 to 4500 square inches. The advantage of this type of parallel plate division is that the catalyst bed is divided into a large number of small sections. Thus, mounding may be allowed to proceed to completion in a particular section, the spread thereof being closely contained, without losing a large total part of the catalyst in the reactor. As additional advantage of the use of such a baffle is that the mound itself blocks off the particular section and thus prevents the passage of vapors through this section unconverted. The catalyst dividers of the present invention may be of stainless steel, or ordinary steel or of any gas impermeable material of sufficient thickness and strength to contain the catalyst in a substantially fixed position in the reactor.

It is, of course, contemplated that the system described in this invention can be utilized in any other process wherein deactivation spreads progressively from one section of the catalyst bed to other sections of the catalyst bed. Thus, for example, it will be of use in catalytic fixed bed reforming (for example, powerforming), hydroforming or similar fixed bed processes.

This invention will be more clearly understood from a consideration of the following examples which present data showing the deactivation occurring in commercial dehydrogenation units and also results obtained with attempting to reactivate a catalyst after mounding has occurred.

A typical prior art dehydrogenation process as described in this invention using calcium nickel phosphate catalyst has been in operation since 1950. Because of the expensive nature of the catalyst, operation per charge of catalyst must be at least 6 months to pay off the catalyst investment. Early runs (1951—1952) were not in excess of 6 months and often as low as 2 month's duration. They were terminated by the formation of serious carbon mounds that were allowed to form to large size relatively undetected. It was found impossible to satisfactorily regenerate these mounds so that the catalyst had to be discarded.

From 1953 on due to the greatly increased use of detection devices such as thermocouples and 'round the clock manning of the process by technical personnel to interpret the data obtained from the detection devices, it has been possible to catch two incipient carbon mounds and regenerate them successfully. On these occasions, catalyst life has been kept in excess of 9 months. However, there have been other occasions when the catalyst mounds formed early in the runs, spread throughout the bed, and were not able to be regenerated thus causing large capital losses in catalyst investment.

In another operation three pairs of reactors using calcium nickel phosphate catalyst were placed onstream in July 1958. Of these units placed onstream in July, two came down in December due to the presence of carbon mounds in the catalyst beds. Both had to be recharged with new catalyst although efforts were made to save and regenerate the catalyst. The one unit which did not develop a carbon mound operated satisfactorily until April 1959 when it too, developed a carbon mound. Again the catalyst charge had to be discarded.

The following table represents general and specific conditions which may be employed in a process to produce butadiene from normal butenes according to the present invention.

TABLE I

*Conditions and Reactants*

| | General | Specific |
|---|---|---|
| Catalyst: | | |
| The preferred catalyst comprises— | | |
| Ni_____wt. percent__ | 4.3–5.5 | 5 |
| Ca_____do____ | 27.8–32.0 | 30 |
| $PO_4^=$_____do____ | 49.0–60.5 | 57 |
| $Cr_2O_3$_____do____ | 1.0–8.0 | 6 |
| Graphite_____do____ | 1.0–3.0 | 2 |
| Reaction Conditions: | | |
| Space velocity of $nC_4^=$, v./v./hr.[1]_____ | 75–200 | 120 |
| Space velocity of steam, v./v./hr.[1]_____ | 1,400–4,000 | 2,300 |
| Reactor inlet temperature, °F_____ | 1,000–1,350 | 1,175 |
| Temp. drop across reactor, °F_____ | 50–100 | 70 |
| Reactor outlet pressure, p.s.i.a._____ | 15–30 | 20 |
| n-butylene conversion, percent per pass___ | 30–60 | 40 |
| Selectivity to butadiene, percent_____ | 75–95 | 85 |
| Regeneration and Burner Conditions: | | |
| Space velocity of steam, v./v./hr.[1]_____ | 500–1,000 | 675 |
| Space velocity of air, v./v./hr.[1]_____ | 75–150 | 105 |
| Regenerator inlet temp., °F_____ | 1,000–1,300 | 1,175 |
| Temp. of effluent gases, °F_____ | 1,000–1,300 | 1,175 |
| Outlet pressure, p.s.i.a._____ | 25–50 | 30 |
| Fuel gas to burner, lbs./hr_____ | 8–12 | 9 |

[1] V./v./hr.—Volume of gas at S.T.P./volume catalyst/hr.

The same catalyst and all the above reaction and regeneration conditions are also used in the process for producing isoprene from isopentenes ore isopentanes except that reaction temperatures in the upper part of the range given are preferred and a specific inlet temperature would thus be higher than that given, e.g., 1215° F. for isopentene and 1340° F. for the conversion of isopentane. Also, with respect to isopentane, conversions per pass rather than 30–60% are only 10–20%. However, since isopentane is comparatively inexpensive, the process is still attractive.

The same catalyst and all the table I reaction and regeneration conditions including the specific conditions are also applicable to the conversion of 2,3-dimethyl butane and 2,3-dimethyl butenes to 2,3-dimethyl butadiene.

What is claimed is:

1. In a continuous process for dehydrogenating olefins to diolefins over a fixed bed of dehydrogenation catalyst wherein $C_4$ to $C_6$ olefin vapors are passed through the bed during the dehydrogenation reaction cycle and wherein an oxygen-containing gas is passed through said bed during the regeneration cycle to reactivate the catalyst, the improvement which comprises passing the vapors through a catalyst bed longitudinally divided into a plurality of sections that are parallel to the flow of vapors through said bed, determining the carbon dioxide content of the effluent gas in the several sections during regeneration and locating catalyst deactivating carbon mounding in a section of the catalyst bed by the presence of higher than normal carbon dioxide content in the effluent regeneration gas from said section, blanking off the section having carbon mounding therein during the dehydrogenation cycle thereby preventing further deactivation and opening said blanked-off section during the regeneration cycle thereby restoring the activity of the catalyst.

2. The process of claim 1 in which the olefins are butenes.

3. In a continuous vapor phase process for dehydrogenating olefins to diolefins over a fixed bed of dehydrogenation catalyst wherein superheated steam and $C_4$ to $C_6$ olefins are passed through the bed during the dehydrogenation reaction cycle and wherein steam and excess oxygen-containing gas are passed through said bed during the regeneration cycle to reactivate the catalyst, the improvement which comprises passing the olefins through a catalyst bed longitudinally divided into a plurality of uniform sections that are parallel to the flow of olefins through said bed, analyzing the carbon dioxide content of the effluent gas from each section during the regeneration cycle in order to locate any sections of the catalyst bed in which catalyst deactivating carbon mounding has occurred, blanking off any section of the catalyst bed having carbon mounding therein during the dehydrogenation cycle and opening said blanked-off section during the regeneration cycle and repeating the procedure of blanking off during dehydrogenation and opening during regeneration until the carbon dioxide analysis of the effluent gas from said section during regeneration indicates that catalyst activity has been restored and thereupon resuming dehydrogenation in said section.

4. The process of claim 3 in which the $C_4$ to $C_6$ olefins are butenes.

5. The process of claim 3 in which the dehydrogenation catalyst is a calcium nickel phosphate catalyst.

References Cited in the file of this patent

UNITED STATES PATENTS

| | | |
|---|---|---|
| 2,423,835 | Houdry | July 15, 1947 |
| 2,474,014 | Seebold | June 21, 1949 |
| 2,641,619 | Noddings et al. | June 9, 1953 |
| 2,666,692 | Dolezal et al. | Jan. 19, 1954 |
| 2,835,560 | Bason et al. | May 20, 1958 |